US006941218B2

(12) United States Patent
Wolf et al.

(10) Patent No.: US 6,941,218 B2
(45) Date of Patent: Sep. 6, 2005

(54) AUTOMATIC START/STOP SYSTEM AND METHOD FOR LOCOMOTIVE ENGINES

(75) Inventors: Daniel F. Wolf, Erie, PA (US); Gerald James Hess, Jr., Erie, PA (US); Jeffrey A. Twichel, Girard, PA (US)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 10/678,528

(22) Filed: Oct. 3, 2003

(65) Prior Publication Data

US 2004/0122586 A1 Jun. 24, 2004

Related U.S. Application Data

(63) Continuation-in-part of application No. 09/873,841, filed on Jun. 4, 2001, now Pat. No. 6,650,993.

(51) Int. Cl.[7] ............................................. G06F 19/00
(52) U.S. Cl. ....................................... 701/112; 701/115
(58) Field of Search ................................. 701/102, 107, 701/110, 112, 114, 115; 123/179.1, 179.4

(56) References Cited

U.S. PATENT DOCUMENTS

| | | | |
|---|---|---|---|
| 4,046,032 A | 9/1977 | Braun et al. | |
| 5,528,901 A | 6/1996 | Willis | |
| 5,828,979 A | 10/1998 | Polivka et al. | |
| 5,878,711 A | 3/1999 | Kamura et al. | |
| 5,928,110 A | 7/1999 | Vornehm et al. | |
| 5,941,792 A | 8/1999 | Amendt et al. | |
| 6,170,452 B1 | 1/2001 | Wisinski | |
| 6,470,844 B2 | 10/2002 | Biess | |
| 6,650,993 B2 * | 11/2003 | Wolf et al. | .................. 701/112 |
| 6,884,128 B2 * | 4/2005 | Okuyama et al. | ............... 440/1 |
| 2001/0049579 A1 * | 12/2001 | Fujino et al. | ................ 701/114 |
| 2004/0002810 A1 * | 1/2004 | Akuzawa et al. | ........... 701/114 |
| 2004/0242091 A1 * | 12/2004 | Okuyama et al. | ............. 440/86 |

* cited by examiner

*Primary Examiner*—John T. Kwon
(74) *Attorney, Agent, or Firm*—Senniger Powers; Scott Andes

(57) ABSTRACT

A method and system for an automatic engine stop and start system in a locomotive that includes deactivating the automatic engine stop system in response to receiving an instruction to prevent the automatic engine stop system from automatically shutting down the locomotive without otherwise disabling the continued operation of the automatic engine stop system. The invention is also an apparatus for controlling a locomotive equipped with an automatic engine stop system. The apparatus includes a receiving interface for receiving a deactivation command from the automatic engine stop system. The apparatus also includes an input device for receiving an instruction to override the received deactivation command. The apparatus further includes a transmitting interface coupled to the input device for transmitting a control command. The transmitted control command is a command other than the received deactivation command such that the control command at least delays the automatic engine stop system from automatically shutting down the locomotive.

15 Claims, 3 Drawing Sheets

AUTOMATIC START/STOP SYSTEM AND METHOD FOR LOCOMOTIVE ENGINES

CROSS REFERENCE TO RELATED APPLICATIONS

The invention of the present application is a continuation-in-part of U.S. patent application Ser. No. 09/873,841, filed on Jun. 4, 2001 U.S. Pat No. 6,650,993, entitled AUTOMATIC START/STOP SYSTEM AND METHOD FOR LOCOMOTIVE ENGINES.

FIELD OF THE INVENTION

The present invention relates to locomotive fuel conservation, and more particularly to control of automatic starting and stopping of locomotive engines.

BACKGROUND OF THE INVENTION

In recent years, locomotives have been equipped with systems for automatically starting and stopping their engines when one or more conditions exist. The primary purpose of such systems is to conserve fuel, thereby lowering fuel costs while also preserving precious energy resources. For instance, a locomotive may be configured to automatically shutdown after operating for a certain amount of time in a parked idle state to prevent the locomotive from needlessly wasting fuel. The locomotive may then automatically restart when, for example, an operator signals an intention to motor the locomotive, such as by moving a direction controller (known as a reverser) from a center position (that is, from a "neutral" position). A locomotive may also be configured to automatically restart a certain amount of time following an automatic shutdown, such as two or four hours, or when other conditions exist.

The automatic engine start and stop (AESS) system described above has been implemented not only in locomotives which operate independently, but also in multiple locomotives that operate together (i.e., in consist) for providing cumulative (or reserve) towing capacity. The front locomotive in the consist is usually designated as the lead unit while the other locomotives are designated trail units. Each trail unit typically receives a trainline signal representing the position of the lead unit's reverser, and treats that signal as representing the position of its own reverser (which is typically placed in the center position when configuring the locomotive for trail unit operation). In the case where a locomotive's reverser must be in the center position to enable the AESS system, placing the lead unit's reverser in the center position will allow the AESS system to be enabled in each locomotive in the consist. Similarly, in the case where moving an automatically shutdown locomotive's reverser from the center position induces an automatic engine restart, moving the reverser in an automatically shutdown lead unit from the center position induces an automatic restart for each automatically shutdown locomotive in the consist.

Although deployed AESS systems have proven reliable, the inventors hereof have discovered human factors that result in unrealized fuel savings. For example, they discovered that operators frequently take steps to prevent automatic engine shutdowns. This is apparently done so that lead units (including single units operating independently and not in a consist) remain available upon demand (i.e., for operator peace of mind), and to provide climate control (i.e., heating and air conditioning) to the operator cabin. Common approaches to preventing automatic engine shutdowns include maintaining a lead unit's reverser out of the center position, and manually moving an automatic start/stop disable switch (ASDS), typically located in a CA1 locker, to an "off" position. Service personnel may also forget to move the ASDS to its "on" position after switching it "off" for safety during maintenance procedures. Regardless of how or why it occurs, preventing an AESS system in a single locomotive from performing its intended function obviously results in lost fuel savings. Moreover, preventing an auto shutdown in the lead unit of a consist may prevent an auto shutdown for each trail unit in the consist. Thus, although an operator may, for example, maintain the lead unit's reverser out of the center position for the sole purpose of keeping the lead unit running, the net result may be that two, three, or even more trail units remain running and consuming fuel, in addition to the lead unit.

A related problem discovered by the inventors is unnecessary operator induced restarts, which occur, for example, when an operator moves the reverser of an automatically shutdown locomotive away from the center position. The apparent reasons for such restarts are essentially the same as those for preventing automatic engine shutdowns, namely, to resume on-demand availability of lead units and to provide climate control to the operator cabin. Again, while an operator's intention may be to simply restart a lead unit, the effect may be to restart every locomotive in a consist.

The inventors have determined that unrealized fuel savings are often an order of magnitude greater than actual fuel savings primarily due to operator interaction issues, and have therefore recognized a need for AESS systems that can interact more favorably with locomotive operators, taking into account operator needs and concerns, so as to realize increased fuel savings and conservation.

SUMMARY OF THE INVENTION

In order to solve these and other needs in the art, the inventors hereof have designed an automatic engine start/stop (AESS) system for locomotives that takes into account these needs and concerns by enabling operators and administrative systems to prevent automatic shutdowns of a locomotive without disabling the AESS systems. Thus, operators or administrative systems can maintain the lead (and/or other) units running (i.e., for peace of mind, climate control, etc.) without disabling their AESS systems and without prohibiting other locomotives in consist from automatically shutting down. The system includes receiving an inhibit command. When the inhibit command is received, the system prevents that locomotive (and only that locomotive) from automatically shutting down within a predefined duration of time, such as two hours. In the event an operating parameter changes such as the initiation of motoring before the predefined duration of time expires, the AESS system may be reset. Otherwise, when the predefined duration of time has passed, the locomotive will automatically shutdown (assuming a set of automatic engine shutdown parameters are satisfied at that time). The present invention also provides several techniques for reminding and prompting an operator or an administrative device or system to enable an AESS system, including sending a notification message, sounding an alarm, displaying and recording fault data, and inhibiting motoring of the locomotive when the AESS system is disabled and an operational or administrative system calls for braking or motoring capability.

In accordance with one aspect of the invention, an engine control system for a locomotive includes a memory device for storing computer instructions. A computer processor executes the computer instructions stored in the memory device. The computer instructions configure the computer processor to output one or more commands when one or more predefined conditions exist. The system also includes engine control hardware for controlling the locomotive engine in response to commands output by the computer processor. The computer processor receives a signal indicative of whether an automatic engine stop system is enabled and normally output an engine shutdown command when the automatic engine stop system is enabled and a set of automatic engine shutdown parameters are satisfied. The computer processor also receives an inhibit command. The computer instructions configure the computer processor to at least delay outputting the engine shutdown command in response to the inhibit command.

According to another aspect of the invention, an engine control system for a locomotive includes memory for storing computer instructions. The system also includes a computer processor for executing the computer instructions stored in memory. The computer instructions configure the computer processor to output one or more commands when one or more predefined conditions exist. The system also includes engine control hardware for controlling the locomotive engine in response to commands output by the computer processor. The computer processor is electrically connected to a device generating a signal indicative of whether an automatic engine stop system is enabled. The computer instructions configure the computer processor to normally output an engine shutdown command when the automatic engine stop system is enabled and a set of automatic engine shutdown parameters are satisfied. The computer processor is also electrically connected to a device generating an inhibit command responsive to an administrative device. The computer instructions further configure the computer processor to at least delay outputting the engine shutdown command in response to receiving the inhibit command.

According to another aspect of the invention, a method of implementing an automatic engine stop system in a locomotive includes deactivating the automatic engine stop system in response to receiving an instruction to prevent the automatic engine stop system from automatically shutting down the locomotive without otherwise disabling the continued operation of the automatic engine stop system.

According to another aspect, the invention is an apparatus for controlling a locomotive equipped with an automatic engine stop system. The apparatus includes a receiving interface for receiving a deactivation command from the automatic engine stop system. The apparatus also includes an input device for receiving an instruction to override the received deactivation command. The apparatus further includes a transmitting interface coupled to the input device for transmitting a control command. The transmitted control command is a command other than the received deactivation command such that the control command at least delays the automatic engine stop system from automatically shutting down the locomotive.

According to yet another aspect, the invention is a method of controlling a locomotive configured with an automatic engine stop system that includes receiving an engine shutdown command from the automatic engine stop system. The method also includes generating a command other than the received engine shutdown command to at least delay the automatic engine stop system from automatically shutting down the locomotive.

According to another aspect, the invention is a method for prompting a locomotive operational control system to enable an automatic engine stop system. The method includes generating a notification when the automatic engine stop system is disabled in response to a change in an operating parameter of the locomotive.

In another aspect, the invention is a method for providing an instruction to an administration device to enable an automatic engine stop system that includes inhibiting motoring of the locomotive until the automatic engine stop system is enabled.

In another aspect, the invention is an automatic engine stop system in a locomotive in a consist, the system including memory for storing computer instructions. A computer processor executes the computer instructions stored in memory. The computer instructions configure the computer processor to output one or more commands. The system also includes a receiver that is electrically coupled to the computer processor for receiving an inter-consist communication from a second locomotive in the consist. The system further includes engine control hardware for controlling the locomotive engine in response to commands output by the computer processor. The computer instructions configure the computer processor to output an engine shutdown command to the engine control hardware as a function of the received inter-consist communication.

In yet another aspect, the invention is a method of implementing an automatic engine stop system in a locomotive in a consist. The method includes receiving an inter-consist communication from a second locomotive in the consist and generating an engine shutdown command responsive to or a function of the received inter-consist communication.

In still another aspect, the invention is a method of implementing an automatic engine stop system in a locomotive including generating an engine shutdown command as a function of a position of the locomotive.

According to another aspect, the invention is a method of implementing an automatic engine stop system in a locomotive including generating an engine shutdown command as a function of a location of a crewmember.

Other aspects and features of the present invention will be in part apparent and in part pointed out hereinafter.

BRIEF DESCRIPTION OF THE DRAWINGS

Corresponding reference characters indicate corresponding features throughout the several views of the drawings.

DETAILED DESCRIPTION OF THE INVENTION

Figure 1:
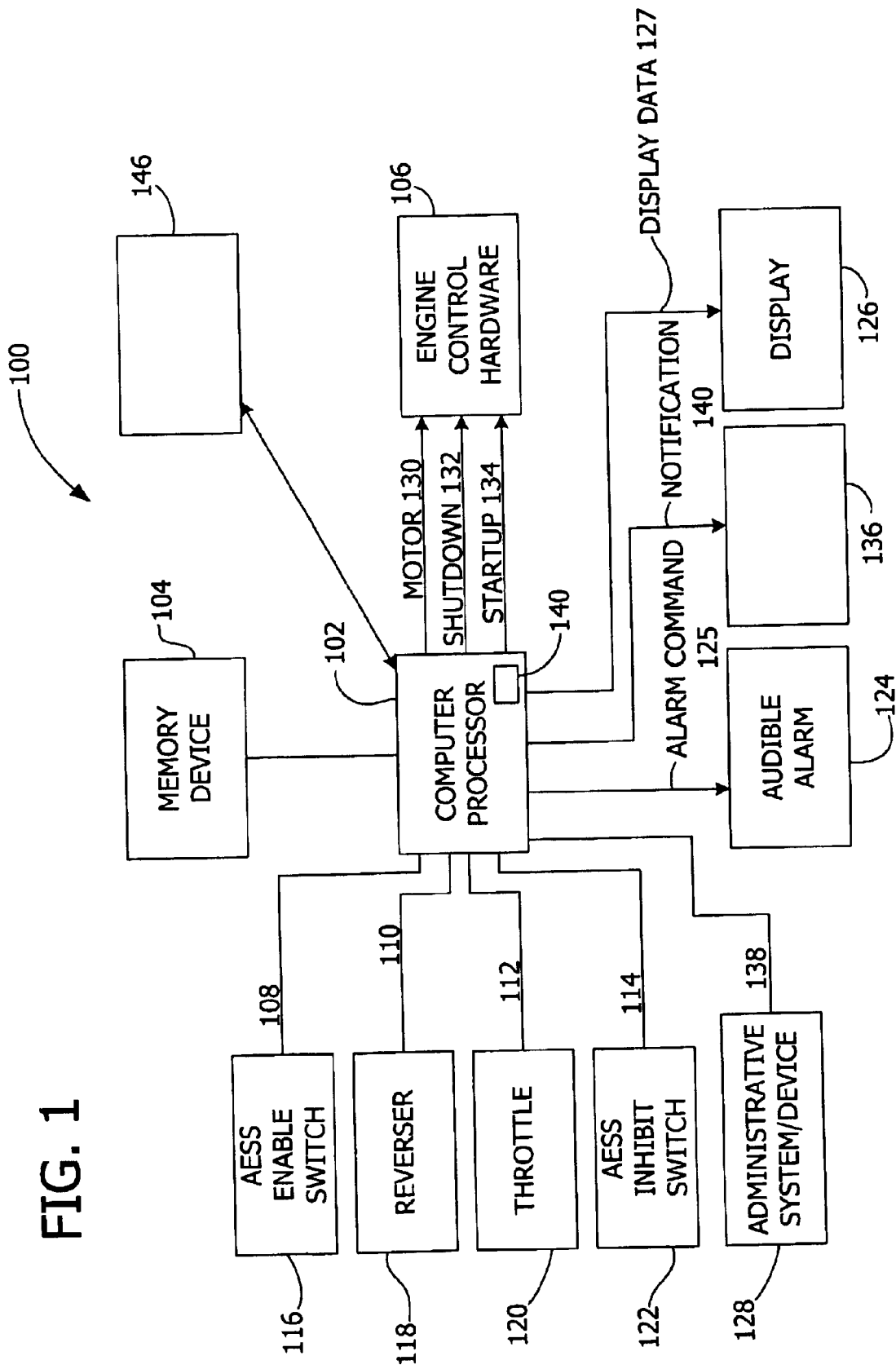
FIG. 1 is a functional block diagram of a locomotive engine control system according to one embodiment of the invention.

A locomotive engine control system according to one embodiment of the present invention is illustrated in FIG. 1 and indicated generally by reference character 100. As shown in FIG. 1, control system 100 includes a computer processor 102, computer executable instructions 142, a memory device 104, and engine control hardware 106. Memory device 104 may itself comprise multiple static and/or dynamic memory devices, as is common. Computer executable instructions 142 may reside on a computer readable medium (not shown). Computer processor 102 is provided with several inputs 108, 110, 112, 114, and 138 for receiving signals from an automatic engine start/stop (AESS) enable switch 116, a reverser 118, a throttle 120, an AESS inhibit switch 122, and an administrative system or device 128, respectively. Signal 108 from AESS enable switch 116 indicates a position of switch 116 that, in turn, indicates whether an AESS system is enabled. Reverser signal 110 from reverser 118 and throttle signal 112 from throttle 120 indicate the respective positions of the locomotive's reverser and throttle. Although a variety of switch types may can be used, AESS inhibit switch 122 is a push-button switch which, when actuated by an operator, sends an inhibit command to computer processor 102 so as to prevent or postpone an automatic engine shutdown, as further described below.

Administrative device 128 may be a system or device which is located on the locomotive, located on another locomotive within a consist of locomotives, or within the train. Additionally, administrative device 128 may be located remotely from the locomotive equipped with system 100 such as located in an operational or administrative center (not shown) or with an operator located within a rail yard. Administrative device 128 may be, for example, a administrative or operational support system, a remote operations system, a handheld device, a remote control, a switch, a personal computer, etc. Administrative device 128 may generate a variety of commands including a deactivation command to request a deactivation of the AESS system or the deactivation of the automatic engine shut down or other engine function. As such, in one embodiment, the operator and/or administrative device 128 is enabled to prevent an automatic shutdown or startup of the lead unit in a consist, or any other unit similarly equipped with control system 100, without disabling an AESS system and without necessarily preventing an automatic shutdown or startup of other locomotives in the consist.

Control system 100 further includes an audible alarm 124, a notification device 136, and/or a display device 126. Audible alarm 124 may sound in response to receiving an alarm command 125 from computer processor 102. In one embodiment, alarm 124 is a trainline alarm which, when activated, sounds within each locomotive in a consist. Notification device 136 may be any notification device receiving a notification 140 from computer processor 102. This may be transmitting a data or computer notification message, sending an email, initiating a telephone call, playing a message, initiating a page, initiating a warning signal, lamp, or computer-based screen alert or notification. Display device 126 displays data 127 received from computer processor 102 including, when applicable, data indicating that an AESS system is disabled. In one embodiment, display data 127 is first received by computer processor 102 over a trainline, and indicates that the AESS system of another locomotive is disabled.

Control system 100 may also be configured to send and receive signals to other locomotives or systems. As shown in FIG. 1, remote locomotive or system 146 may include an inter-consist communication link 144. Such inter-consist communication may include a notification or coordination of the position of the locomotive configured with control system 100 relative to one or more other locomotives or railway cars within the consist or train. Additionally, such a communication link may include the identification or location of one or more crewmembers or operators of the consist or train.

Those skilled in the art will recognize that control system 100 may include components in addition to those shown in FIG. 1, and that computer processor 102 may include inputs and outputs in addition to those shown in FIG. 1.

Memory device 104 may store computer instructions 142 to be executed by computer processor 102. Computer instructions 142 configure computer processor 102 to output one or more commands when one or more predefined conditions exist. For example, computer processor 102 may output a motor command 130 in response to signals from reverser 118 and throttle 120 indicating an operator's attempt to motor (i.e., move) the locomotive. Additionally, computer processor 102 may output a command in response to a change in one or more operating parameters or an administrative signal 138 from administrative device 128. Such changes in operating parameters are discussed in greater detail below. The engine control hardware controls the locomotive engine (not shown) in response to commands output by computer processor 102, including the motor command 130, a shutdown command 132, and a startup command 134. As apparent to those skilled in the art, engine control hardware 106 may include a variety of components including invertors, relays, an alternator, a fuel pump, etc.

As noted, one or more operations of system 104 and therefore the determination of output commands may be implemented in computer executable instructions 142 and executed on computer processor 102. These may be a function of or in response to a change in one or more operating parameters. Such operating parameters may include, but are not limited to, a braking parameter, a motoring parameter, a configuration setting, a throttle setting, an operating mode, an operator authorization, and an administrative command. The braking parameter may be a monitored or sensed change in a dynamic braking mode or system, or a change in a mechanical or air brake system, such as the release or operation of the brake. The motoring parameter may be a throttle or notch setting, or may be a horsepower setting, a measured horsepower output, a speed, a wheel slippage, etc. A configuration setting may be a change in a configuration of a locomotive such as a configuration mode, an operating mode, a hybrid energy mode (storage or electrical energy), and a change in an optimization mode (emissions optimization, fuel optimization, and trip optimization). An operator authorization may be related to the authorization associated with a particular train operator (such as a geographic zone or security rating). An administrative command may be associated with an administrative system that is providing administrative commands or signals to system 100 for control or operation of one or more functions of the locomotive or system 100.

One embodiment of an operation of control system 100 will now be described with reference to flow chart of FIG. 2. After beginning at block 200, processing proceeds to block 202 where the control system determines whether AESS system 100 is enabled (e.g., using the signal from AESS enable switch 116). If AESS system 100 is enabled, processing branches to block 204 where control system or processor 102 determines whether an inhibit command has been received from the locomotive operator (e.g., using the signal from AESS inhibit switch 122) or from administrative device 128. If not, processing continues at block 206 where it is determined whether a set of automatic engine shutdown parameters are satisfied. As known in the art, this set of parameters may require the engine to have been running for some minimum amount of time, zero ground speed, a minimum engine oil temperature, a minimum brake air pressure, reverser 118 in the center position, throttle 120 in the idle position, etc. If the set of auto engine shutdown parameters are not satisfied, processing loops back to block

Figure 2:
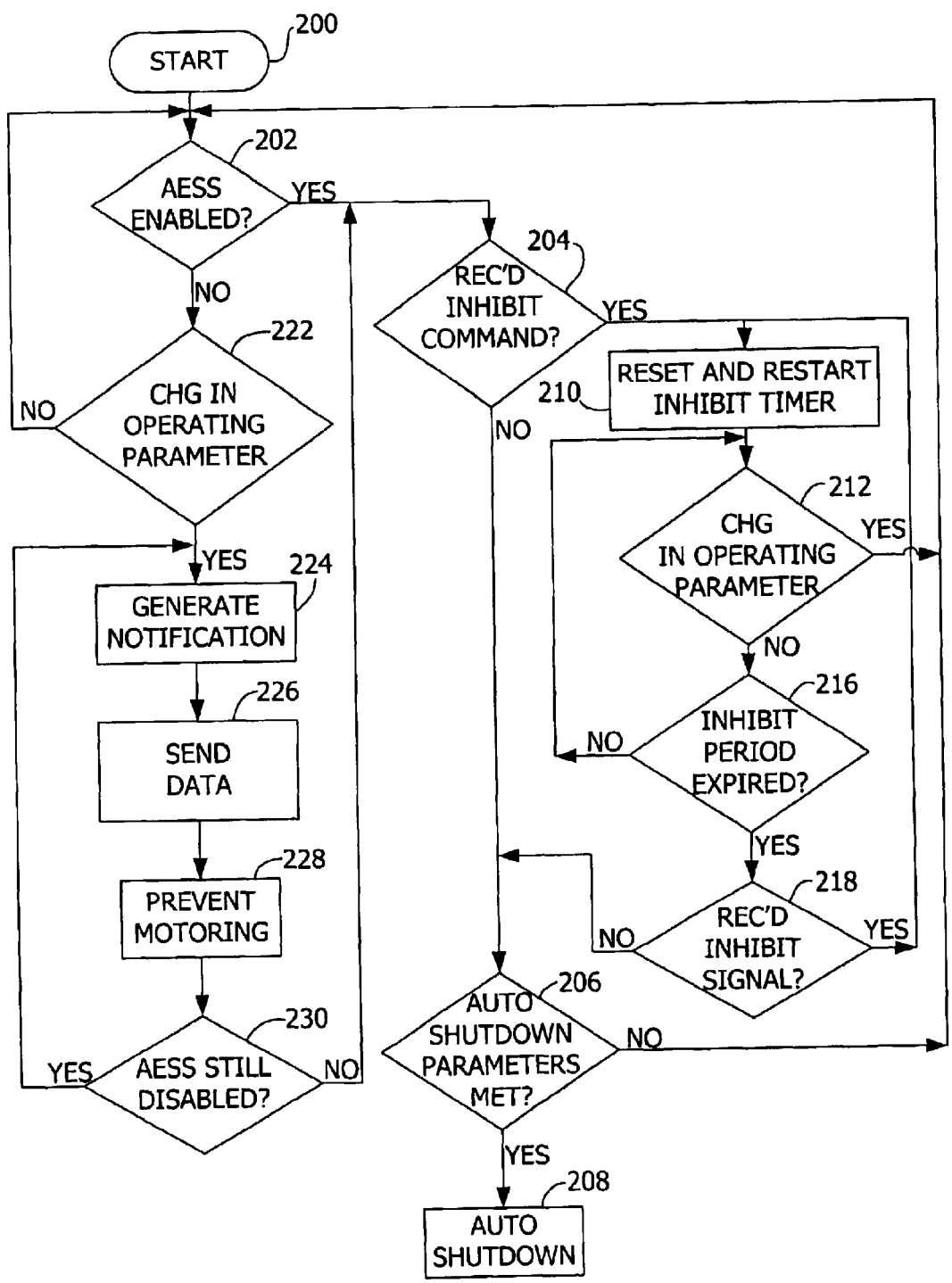
FIG. 2 is a flow chart illustrating one embodiment of the operation of the control system of FIG. 1.

202, as shown in FIG. 2. Otherwise, processing proceeds to block 208 where the locomotive engine is automatically shutdown so as to conserve fuel (e.g., by sending shutdown command 132 to engine control hardware 106). This is considered the normal operation of control system 100, when an inhibit command is not received from the operator or administrative device 138.

Referring again to block 204, if an inhibit command has been received from the locomotive operator or administrative device 138, processing branches to block 210. In one embodiment, when AESS inhibit switch 122 is actuated by the operator, control system 100 refrains from automatically stopping the locomotive engine for a predefined duration of time, such as two hours. In this manner, the operator or administrative device 138 can temporarily deactivate the AESS system so as to postpone an automatic engine shutdown without disabling the AESS system. During this time, the deactivated AESS system continues to process inputs and outputs, but will not output shutdown command 132. The AESS system is reactivated automatically when the predefined inhibit period times-out, and will then proceed to automatically shutdown the locomotive if the set of automatic engine shutdown parameters are satisfied and another inhibit command has not been received. Accordingly, an inhibit timer (which may be implemented within computer processor 102 or computer executable instructions 142) is started in block 210 to measure the amount of time elapsed following receipt of the inhibit command or signal. Processing then proceeds to block 212, where the control system determines whether a change in an operating parameter such as the initiation of motoring of the locomotive (e.g., as determined by signals from reverser 118 and throttle 120, signals received from an administrative signal, signals related with monitored devices, or, in the case where the locomotive is operating as a trail unit in a consist, by trainline signals from the reverser and throttle of the lead unit). If motoring has been initiated, processing automatically reactivates the AESS system by branching back to block 202, as shown in FIG. 2.

If control system 100 determines in block 212 that a change in the one or more operating parameters has not occurred, processing proceeds to block 216 where the system determines whether the predefined inhibit period has expired. If not, processing loops back to block 212. If the inhibit period has expired, processing continues at block 218 to determine whether another inhibit signal has been received. Thus, the system can repeatedly postpone an automatic shutdown of a locomotive engine when an inhibit command is periodically received. If another inhibit signal has not been received, processing branches to block 206 in order to determine whether the set of automatic engine shutdown parameters are satisfied, as described above. If the system determines at block 218 that another inhibit signal has been received, processing branches back to block 210 where the inhibit timer is reset and restarted, and then proceeds as described above.

It should be clear from the description above that, in one embodiment, the AESS system is automatically reactivated, and the prior inhibit command is disregarded, when the predefined inhibit period expires, or when the change in the operating parameter occurs (if sooner). This functionality may be implemented locally within each locomotive in a consist so that the AESS system of a particular locomotive in the consist can be locally deactivated without necessarily affecting the AESS systems of other locomotives in the consist.

Referring again to block 202 of FIG. 2, if the system 100 determines that the AESS system is disabled (e.g., because AESS enable switch 116 is in an "off" position or the system has received a disable command from the administrative system 138), processing proceeds to block 222 where the control system determines whether a change in an operating parameter has occurred, such as initiation of braking or motoring. If not, processing loops back to block 202. If a change in an operating parameter has occurred, processing continues at block 224 where an audible alarm is sounded so as to remind and prompt the operator or the administrative device 128 to enable the AESS system. In one embodiment of the invention, the audible alarm is a trainline alarm which sounds within every locomotive in a consist. In this manner, an operator in a lead unit may discover upon initiating braking or motoring that the AESS system in the lead unit, or an AESS system in a trail unit, is disabled. In another embodiment, processor 102 may initiate a notification such as an email or alarm signal to one or more administrative devices or systems 128. Processing continues at block 226 where fault information or data is generated and sent to an administrative device 128. The displayed fault information indicates that the AESS system is disabled, and prompts the operator to enable the AESS system (e.g., by explaining the necessary step(s)). In one embodiment, the fault information is placed on the trainline, and is presented on the display of each locomotive in a consist.

Also in block 226, fault data is recorded in the memory device 104 so as to record each instance when the operator initiates braking or motoring while the AESS system is disabled (which should generally only occur during a maintenance procedure). Continuing at block 228, the control system 100 may also prevent the locomotive from motoring (e.g., by withholding the motor command 130) while the AESS system is disabled, again in an effort to prompt the operator to enable the AESS system. In one embodiment, this functionality is implemented only locally (i.e., not via the trainline). Therefore, if the AESS system in a trail unit of a consist is disabled, the lead unit will still have motoring capability. At block 230, control system 100 determines whether the AESS system is still disabled. If it is, processing loops back to block 224 such that the notification continues to be generated, fault data continues to be sent and recorded at block 226, and motoring or another operation of the locomotive remains inhibited. Alternatively, if it is determined in block 230 that the AESS has been enabled, processing loops back to block 204, as shown in FIG. 2.

It should be clear from the description above that one or more embodiments of the invention enables a railway system, operator, or administrative device to prevent or at least postpone an automatic shutdown of a locomotive engine without disabling an AESS system. Accordingly, during normal operations (in contrast to maintenance operations), there may not be a need for AESS enable switch 116, which remains in the "on" position. For this reason, in one embodiment of the invention, AESS enable switch 116 is moved from the CA1 locker to a location less accessible to operators, such as a high voltage maintenance cabinet (e.g., the auxiliary cabinet), to further reduce the likelihood of an on-board operator disabling the AESS system during normal operations by moving the AESS enable switch 116 to the "off" position.

In the embodiment described above with reference to FIG. 2, multiple prompts are employed (i.e., the alarm sounds, fault data is displayed and recorded, an email message is sent, a page is sent, and motoring or another operation of the locomotive is inhibited) when the AESS system is disabled and a braking, motoring or other operating function of the locomotive is requested by an operator or an administrative device. It should be understood, however, that fewer than all of such prompts may be used in certain applications without departing from the scope of the invention. It should also be understood that the teachings of the present invention can be applied in conjunction with or without automatic engine restart capability.

Figure 3:
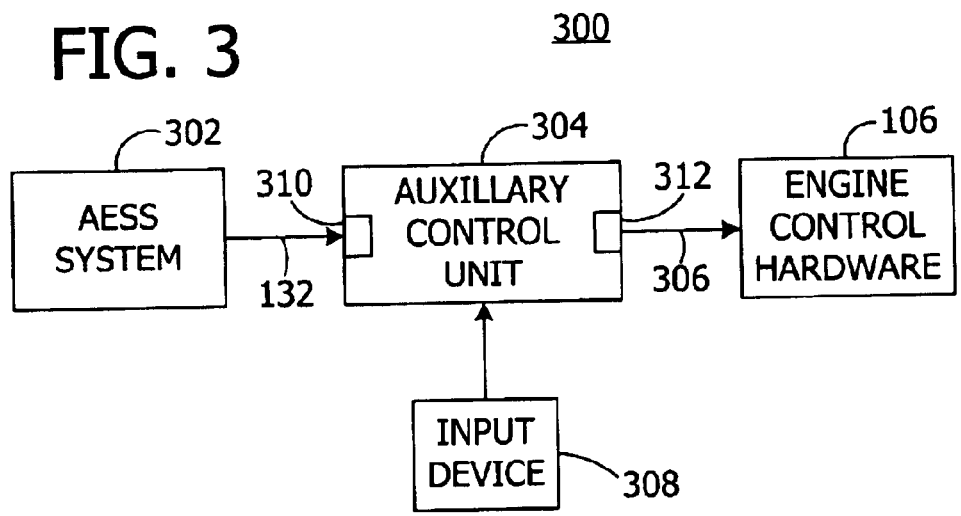
FIG. 3 is a block diagram of another embodiment of a locomotive control system according to the invention.

In one embodiment, as shown in FIG. 3, a system and method consistent with the above discussion may be implemented in an auxiliary control unit 304. As shown, an AESS system 302 may operate according to known AESS procedures or as discussed above with regard to control system 100. However, in this embodiment, AESS system 302 outputs one or more commands to control one or more functions of engine control hardware 106. Auxiliary control unit 304 is equipped with a receiving interface for receiving command signal 132 and a transmitting interface for transmitting one or more commands 306 to engine control hardware 106. Control unit 304 is also configured with an input device 308 for receiving one or more instructions. Such instructions may be received from a switch or may be received from an administrative device in the form of a computer message or command. Upon receipt of command 132 from system 302 that requests a deactivation or shutdown of one or more functions of the engine control hardware, when an instruction is received by input device 308 to override the received deactivation command, control unit 304 initiates a command signal 306 to engine control hardware 106 that is something other than the received command signal 132. In this embodiment, control command 306 delays or cancels the shut down or deactivation of one or more locomotive operations or engine functions, as compared to command 132 as received from AESS system 302.

In another embodiment, one or more operations of the AESS system may be dependent on or a function of information, a message, a signal, or a notification received from inter-consist communication 144 or from the administrative device 128. As one example, inter-consist communication 144 may indicate that the present locomotive is operating in a lead locomotive mode relative to the other locomotives in a consist. In such situation, processor 102 may determine that, while the AESS system would otherwise determine that a shutdown of the present locomotive is desirable, the automatic shut down of the present locomotive would be delayed or inhibited so that the engine and functions of the lead locomotive continue to be active and operational.

Similarly, in another embodiment, a location of a crew member or operator on one or more locomotives or railcars may be known, for example, as indicated by a trainline, inter-consist communication 144, or from the administrative device 128. In such an embodiment, one or more commands or determinations of processor 102 may be a function of the location of the crewmember. For example, a crewmember may be located in a locomotive that would otherwise be shutdown by AESS system 302. However, if the locomotive was operating during the winter, it may be desirable to inhibit the automatic shutdown of the engine of the locomotive in which the crewmember is located in order to provide the crewmember with power in excess of auxiliary power.

It should be understood that the methods described herein may be implemented in software and may be comprised in computer executable instructions that may reside on any type of computer readable medium or may be communicated via any type of communication medium or format.

When introducing elements, aspects, or features of the invention or one or more embodiments thereof, the articles "a", "an", "the" and "said" are intended to mean that there are one or more such elements, aspects, or features. The terms "comprising", "including" and "having" are intended to be inclusive and mean that there may be additional elements, aspects, or features other than those listed.

Those skilled in the art will note that the order of execution or performance of the methods illustrated and described herein is not essential, unless otherwise specified. That is, it is contemplated that aspects or steps of the methods may be performed in any order, unless otherwise specified, and that the methods may include more or less aspects or steps than those disclosed herein.

As various changes could be made in the above embodiments without departing from the scope of the invention, it is intended that all matter contained in the above description or shown in the accompanying drawings shall be interpreted as illustrative and not in a limiting sense.

What is claimed is:

1. An engine control system for a locomotive, the control system comprising:

a memory device for storing computer instructions;

a computer processor for executing the computer instructions stored in the memory device, the computer instructions configuring the computer processor to output one or more commands when one or more predefined conditions exist; and engine control hardware for controlling the locomotive engine in response to commands output by the computer processor;

the computer processor receiving a signal indicative of whether an automatic engine stop system is enabled;

the computer instructions configuring the computer processor to normally output an engine shutdown command when the automatic engine stop system is enabled and a set of automatic engine shutdown parameters are satisfied;

the computer processor receiving an inhibit command;

the computer instructions further configuring the computer processor to at least delay outputting the engine shutdown command in response to the inhibit command.

2. An engine control system for a locomotive, the control system comprising:

a memory for storing computer instructions;

a computer processor for executing the computer instructions stored in memory, the computer instructions configuring the computer processor to output one or more commands when one or more predefined conditions exist; and engine control hardware for controlling the locomotive engine in response to commands output by the computer processor;

the computer processor being electrically connected to a device generating a signal indicative of whether an automatic engine stop system is enabled;

the computer instructions configuring the computer processor to normally output an engine shutdown command when the automatic engine stop system is enabled and a set of automatic engine shutdown parameters are satisfied;

the computer processor being electrically connected to a device generating an inhibit command responsive to an administrative device; and the computer instructions further configuring the computer processor to at least delay outputting the engine shutdown command in response to receiving the inhibit command.

3. The control system of claim 2 wherein the administrative device is on-board the locomotive.

4. The control system of claim 2 wherein the administrative device is off-board the locomotive.

5. The control system of claim 2 wherein the delay of outputting the engine shutdown command continues until a signal to terminate the delay is received.

6. The control system of claim 2 wherein the computer instructions configure the computer processor to delay outputting the engine shutdown command for a predefined duration of time after the computer processor receives the inhibit command.

7. The control system of claim 6 wherein the computer instructions configure the computer processor to disregard the inhibit command in response to a change in an operating parameter during the predefined duration of time.

8. The control system of claim 2 wherein the computer instructions configure the computer processor to normally output a motor command to the engine control hardware in response to a change in an operating parameter, and further configure the computer processor to withhold the motor command if the automatic engine stop system is disabled.

9. The control system of claim 2, further comprising a notification system providing a notification in response to a notification command from the computer processor, the computer instructions configuring the computer processor to output the notification command when the automatic engine stop system is disabled apd in response to a change in an operating parameter of the locomotive.

10. The control system of claim 9 wherein providing a notification is providing an alarm message to the administrative device.

11. The control system of claim 2 wherein the computer instructions configure the computer processor to record fault data in memory when the automatic engine stop system is disable and in response to a change in an operating parameter of the locomotive.

12. The control system of claim 2 wherein the computer instructions further configuring the computer processor to send data indicating the automatic engine stop system is disabled to the administrative device when the automatic engine stop system is disabled and in response to a change in an operating parameter of the locomotive.

13. The control system of claim 12 wherein the operating parameter is from the list: a braking parameter, a motoring parameter, a configuration setting, a throttle setting, an operating mode, an operator authorization, and an administrative command.

14. The control system of claim 2 wherein the computer processor being further electrically connected to a device for receiving an inter-consist communication from a second locomotive, said computer instructions configuring the computer processor to output the one or more commands as a function of the received inter-consist communication.

15. The control system of claim 14 wherein the inter-consist communication includes a relative position of the second locomotive, said computer instructions configuring the computer processor to output the engine shut down command as a function of a relative position of the locomotive and as a function of the relative position of the second locomotive.

* * * * *